United States Patent [19]

Harrington et al.

[11] Patent Number: 5,780,173

[45] Date of Patent: Jul. 14, 1998

[54] DURABLE PLATINUM/POLYIMIDE SENSING STRUCTURES

[75] Inventors: Charles Robert Harrington; Marie Irene Harrington; Michel Farid Sultan, all of Troy; John Richard Troxell, Sterling Heights, all of Mich.

[73] Assignee: General Motors Corporation, Detroit, Mich.

[21] Appl. No.: 706,756

[22] Filed: Sep. 4, 1996

Related U.S. Application Data

[63] Continuation-in-part of Ser. No. 523,987, Sep. 6, 1995, Pat. No. 5,631,417.

[51] Int. Cl.[6] .......................... B32B 15/00; B32B 15/01; B32B 3/00; B21C 37/00

[52] U.S. Cl. .................. 428/661; 428/662; 428/670; 428/606; 428/926; 257/769; 205/170; 205/183; 205/212; 205/917

[58] Field of Search .................... 428/670, 662, 428/432, 661, 606, 926; 257/769; 205/170, 183, 212, 917

[56] References Cited

U.S. PATENT DOCUMENTS

| | | | |
|---|---|---|---|
| 2,719,797 | 10/1955 | Rosenblatt | 117/65 |
| 3,547,600 | 12/1970 | Gwynn et al. | 428/662 |
| 4,423,087 | 12/1983 | Howard et al. | 428/670 |
| 5,086,650 | 2/1992 | Harrington et al. | 72/204.21 |
| 5,243,858 | 9/1993 | Erskine et al. | 73/204.26 |
| 5,263,380 | 11/1993 | Sultan et al. | 73/204.26 |

*Primary Examiner*—Cathy F. Lam
*Attorney, Agent, or Firm*—George A. Grove

[57] ABSTRACT

The durability and reliability of a polymer layer/metal layer sensor structure is improved by the incorporation of a metal oxide, e.g., tantalum oxide ($Ta_2O_5$), layer between the polymer, e.g., polyimide, and the metal, e.g., platinum, sensor element.

13 Claims, 2 Drawing Sheets

DURABLE PLATINUM/POLYIMIDE SENSING STRUCTURES

This invention is a continuation-in-part of U.S. Ser. No. 08/523,987, filed Sep. 6, 1995, now U.S. Pat. No. 5,631,417, and assigned to the assignee of this invention.

TECHNICAL FIELD

This invention pertains to layered structures which use catalytic metals in contact with a polymeric surface such as might be used in air mass flow sensors. For example, this invention relates to such sensors in which a barrier layer between a polyimide thermal insulation layer and a platinum metallization layer contributes to the electrical and structural performance and stability of the sensing device.

BACKGROUND OF THE INVENTION

Measurement of air mass in the air induction system of an internal combustion engine is an essential component of one control strategy which permits operation with low polluting emissions, good fuel economy and superior engine performance. One type of mass air flow sensing apparatus designed for automotive applications comprises a silicon wafer or chip having a surface coated with an insulating polyimide layer that in turn carries a lineal platinum film resistance heater energized with current pulses to propagate thermal waves and an adjacent platinum film thermistor(s) downstream of the heater to detect the arrival of each thermal wave. Where the sensor is required to detect and measure bi-directional flow, a thermistor on the chip upstream of the heater is also employed. Associated electronic circuitry that may, for example, be carried as a flexible circuit is employed to detect the cooling effect of a flowing air stream on the thermistors and thus measure the mass flow rate of the air stream. Such devices are described in U.S. Pat. Nos. 5,086,650; 5,243,858 and 5,263,380, assigned to the assignee of this invention.

As described, for example, in U.S. Pat. No. 5,263,380, a representative mass air flow sensor comprises a silicon wafer as a supportive base layer with a planar surface, a thin polyimide thermal and electrical insulation layer on the silicon surface, and a platinum film heating element with upstream and downstream platinum film thermistor elements fabricated onto the polyimide layer. When a sinusoidal voltage is applied to the heating element, oscillatory heat waves propagate outward from the heating element to the upstream and downstream detectors. The propagation of the heat waves is affected by the direction and amount of mass air flow over the sensor. The flow rate of air affects the temperature of the platinum thermistors (i.e., the sensing elements), and the temperature of the sensing elements affects the resistance of the element which is detected by the external circuit. Sensors of this type have been found effective for measuring the mass air flow such as that flow inducted into an automotive engine.

Obviously, the effectiveness of such sensors depends upon their reliability and durability over a wide range of static and dynamic engine operating conditions. The sensor must be capable of quickly and continuously relaying the temperature of a location within the fluid stream in a repeatable and representative manner. Electrical signals generated or detected by a high performance temperature sensing device need to be very reproducible and precise over the engine operating conditions.

In sensors of the type described in the above patents, silicon is a material well suited for the substrate material principally due to its availability, low cost and strength when processed in wafer form. Other suitable supportive materials could be used. However, since silicon is a very good thermal conductor, fabrications of heaters and temperature sensing devices directly on the silicon wafer is undesirable. For this reason, a polymeric insulation film is deposited on the sensing surface of the silicon wafer.

Although most polymers would exhibit suitable qualities, polyimide coatings are among the best with near ideal properties as a substrate for supporting heating and temperature sensing thermistors. Polyimides are characterized by the presence of the phthalimide groups in the polymer backbone. They are extremely resistant to corrosion since they are organic polymers. Polyimide resins are electrically resistive and have very low thermal conductivity and low thermal diffusivity. Therefore, they are resistant to absorbing heat and to the conduct of heat within their films. Furthermore, metals can readily be deposited onto polyimide films with good adhesion.

A platinum heater element strip, as well as platinum thermistor strips, can be deposited on a polymeric film by sputtering or other techniques. Platinum is particularly suitable for use in air flow sensors and the like because of its chemical stability in such environments. However, the use of platinum as a temperature detector depends upon the value and stabilization of its temperature coefficient of resistivity (TCR). Here, TCR is defined as a percentage change in electrical resistance per Celsius degree of temperature change at 0° C. Platinum is found to be a cost effective material in mass air flow devices to estimate temperature when its TCR is stable at a level near its optimum values. Other corrosion-resistant metals with suitable electrical properties may be used for other purposes. For example, other platinum group (or "noble") metals such as palladium may be used instead of platinum.

Although durability and stability concerns for each of the above individual materials—silicon, polyimide and platinum—are minimal, it is now observed that the platinum and polyimide are incompatible when in contact with each other in air at temperatures above about 215° C. It has been observed that physical deterioration in air of cured polyimide layers is catalyzed by contact with high quality sputtered platinum films. Like other catalytic metals such as Pd, there is evidence that atomic oxygen may be generated near or within the platinum layer, which can decompose a polymer film. Since a mass air flow sensor must operate at the high temperatures of the engine compartment in an air stream and the sensor is heated, deterioration of the polyimide layer affects the reliability and durability of the sensor.

Accordingly, the present invention provides a sensor based on the polyimide/platinum system which includes a barrier layer that provides long term reliability and optimum TCR properties of the platinum films when the sensor is exposed to water, salt, organic solvents or the like at relatively high ambient or operating temperatures. It also provides a means of selectively patterning cured polymer films at relatively low temperatures.

SUMMARY OF THE INVENTION

In a preferred embodiment, this invention provides platinum/polyimide sensing structures that are durable and generate reproducible and precise electrical signals over a wide range of static and dynamic conditions. These objects and advantages are achieved by providing a suitable metal oxide barrier layer between the metal heater strip and thermistor strips and adjacent polyimide film layers. In a broader aspect of the invention, such metal oxide barrier may be employed in other layered structures in which a polymer insulative layer may be degraded by unintended activity of an overlying metal layer.

In accordance with an example of the invention, a silicon wafer (or other suitable support structure) is provided. A thin film of suitable polyimide (PI) resin is applied to the surface of the silicon wafer. A suitable thickness for the thermally and electrically insulative polyimide film is, for example, of the order of 15 to 20 micrometers (µm). A suitable metal oxide layer is then formed such as by reactive sputtering refractory metal oxides such as $Al_2O_3$, $Cr_2O_3$, $Ta_2O_5$ and others when the stoichiometry of the deposit is adequately controlled. The metal oxide layer, e.g., tantalum oxide, is suitably about 30 to 50 nanometers (nm) in thickness. It is preferred that in the finished form of the subject sensor, the composition of the tantalum oxide barrier film be substantially $Ta_2O_5$. A coextensive platinum metallization layer is deposited onto the metal oxide layer suitably to a thickness of about 100 to 300 nanometers. Photolithographic practices may then be employed to define the heating element and thermistor elements in the platinum metallization to complete the manufacture of the sensor chip. The combination of polyimide (PI)/$Ta_2O_5$/Pt films illustrates the basic structure of this invention.

There will be some sensor applications in which it may be desirable to provide a polyimide (or other polymeric) passivation layer over the platinum (catalytic metal) sensor elements. For example, if the air stream is humid, water condensation could cause an electrical short in the sensor. Thus, the purpose of the polyimide passivation layer is to chemically isolate, but not thermally isolate, the platinum films from the air stream. In order to protect this polyimide passivation layer (suitably about 1 µm in thickness), it is again preferable to form a tantalum oxide layer (e.g., 10–30 nm thick) over the platinum sensor elements before application of the polyimide passivation overlayer.

Thus, in accordance with a preferred embodiment of the invention, suitable polyimide films are employed to provide thermal isolation and protection for the platinum electrodes. However, in the case of each platinum electrode, a tantalum oxide layer is provided between the platinum electrode and any adjacent polyimide film layer.

While the invention has been described in terms of a brief summary, other objects and advantages of the invention will become more apparent from a detailed description thereof which follows. Reference will be had to the drawings in which:

As indicated, the structural elements of the illustrated sensors are enlarged for viewing, and the thicknesses of the layers are not necessarily to accurate scale.

DESCRIPTION OF PREFERRED EMBODIMENTS

This invention is applicable to sensor structures or other layered structures based on the combination of a polymeric insulation layer and metal layers that may induce or catalyze the degradation of the polymer layer in certain operating environments. An example of the application of such a sensor structure is in a mass air flow sensor for use in an automobile air induction duct. A bi-directional mass air flow sensor is illustrated which is adapted to be capable of detecting air flow in both an upstream and downstream direction in the induction passage. Such a sensor employs a platinum resistance heater element in the form of a film strip that is aligned transverse with respect to the anticipated direction of air flow. An input voltage is applied to terminals of the heating strip. Heat propagates outward from the heating element to upstream and downstream temperature detectors. The temperatures sensed at these detectors depend upon the direction and flow rate of the air stream to be detected and measured. Thin film strip electrical resistors which sense local temperature (thermistors) are commonly used as the detectors in mass air flow sensors. The thermistor film strips are aligned closely parallel to and on each side of the heating strip. A bias current is applied to each thermistor strip and the voltage across each thermistor is changed by ambient temperature variations. Typical designs of resistance temperature detectors use platinum metal deposited as a thin film (e.g., 0.1 to 0.3 µm in thickness) on a polyimide insulating substrate. The metallization is patterned to utilize its temperature coefficient of resistivity to detect temperature changes.

In order for the platinum thermistor strips to function properly, they must be deposited or formed so as to obtain a stable TCR property near its optimum value. This means that the platinum must be depositable upon an adjacent structure of the sensor without affecting the adjacent structure and to obtain the optimal properties of the platinum metallization. It is the purpose and benefit of this invention to achieve such optimal properties in a sensor structure involving platinum metallization and polyimide thermal insulation layer.

Figure 1:
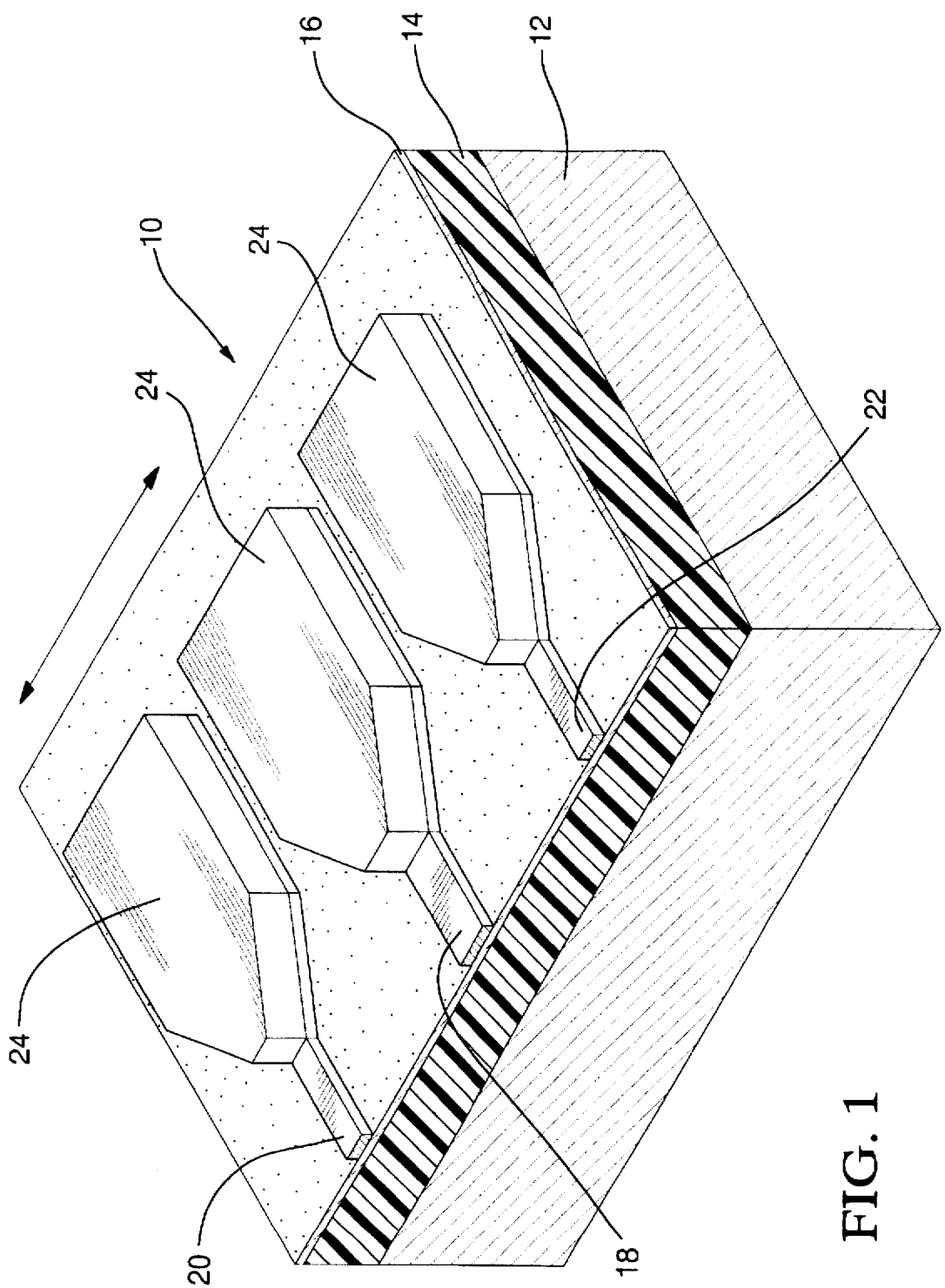
FIG. 1 is an enlarged isometric view, partly broken away and in section, depicting a silicon wafer/polyimide film/tantalum oxide film/platinum fiber structure of a mass air flow sensor.

An embodiment of the subject sensor construction is depicted in FIG. 1. The sensor 10 uses a silicon chip or wafer 12 as the principal structural support for the sensor. A coextensive polyimide thermal isolation layer 14 overlies the silicon substrate. A coextensive tantalum oxide ($TaO_x$) layer 16 overlies the polyimide, and a platinum heater strip element 18 is formed on the tantalum oxide layer with parallel upstream and downstream platinum thermistor strips 20 and 22. The alignment of the platinum heater 18 and platinum thermistors 20 and 22 is transverse to the intended directions of air flow in the induction plenum (not shown) indicated by the two-headed arrow above the sensor. Gold (or other suitable shunting metal such as aluminum) contact pads 24 are applied at enlarged end portions of each of heater strip 18 and thermistor strips 20 and 22 for high electrical conductivity connections with an external circuit, not shown. (Note that only one end of strips 18, 20 and 22 is shown.)

FIG. 1 depicts part of a single sensor. However, it will be recognized that such sensor structures could be fabricated starting with a relatively large diameter silicon wafer upon which several sensor bodies can be prepared and from which individual sensor chips are cut. Thus, in a preferred method of manufacture of subject sensors, one would start with a thin silicon round wafer (e.g., 100 mm in diameter and 0.5 mm thick), prepare its surface by suitable known cleaning processes and then deposit a coextensive polyimide film on the surface of the silicon wafer.

Known curable liquid polyimide materials are commercially available in integrated circuit applications, i.e., for the purpose of applying polyimide films to the working surface of silicon wafers and the like. For example, DuPont™ 2574D polyimide liquids are dispersed at the center of a silicon wafer which is spun, for example, at a suitable speed of 1400 RPM for 120 seconds. The wafer is then heated at increasing temperatures from 70° C. to 300° C. for the purpose of drying and/or curing the polyimide layer. Subsequent polyimide layers are formed in the same manner as necessary until a polyimide layer thickness is achieved. A suitable thickness for the layer is, for example, in the range from about 15 to 25 micrometers. The purpose of the polyimide as indicated above is that it provides suitable chemical isolation, thermal and electrical resistance between the active platinum electrodes and the silicon substrate. The polyimide provides its properties and is suitable for use at temperatures below about 400° C.

In prior practices, the platinum electrodes would be applied directly to the polyimide. However, it is found that in the processing of the platinum electrodes and/or the operation of the device, the surface of the sensor sees temperatures approaching 200° C. to 220° C. in air. At these temperatures, it is now found that the platinum catalyzes degradation of the polyimide layer. This degradation not only destroys the thermal isolation layer but also causes a change in location of the platinum electrodes and affects their electrical properties and output. Thus, the output of the device does not remain stable and accurate. In the case of thermal patterning, the platinum metal becomes sacrificial and its remains are discarded prior to subsequent processing.

Tantalum Oxide Layer Formation

Accordingly, in accordance with an exemplary embodiment of this invention, a coextensive layer of tantalum oxide 16 is deposited on the polyimide isolation layer 14. The tantalum oxide layer is suitably formed by sputtering tantalum onto the polyimide surface in an argon-oxygen plasma. This practice is known as reactive sputtering. A suitable sputtering practice for tantalum oxide is as follows.

The polyimide-coated samples are loaded into a sputtering chamber with rotating substrate holder capability. The chamber is evaluated to below about 10 E-6 Torr pressure and then heated 30 minutes under quartz lamp radiation to a temperature near 240° C. Provision is made to continuously flow argon and oxygen into the chamber. A vacuum pump throttle valve is activated for decreased pumping speed, and two mass flow controllers are used to precisely maintain chamber pressures of Ar and $O_2$. The throttle orifice size must also permit removal of an adequate amount of gas for attaining and maintaining a pressure below about 25 mTorr. Ar flow is adjusted to achieve a chamber pressure of about 7 mTorr. Independently, $O_2$ flow is adjusted to increase the combined pressure of the gases by about 0.7 mTorr. The ratio of mass flow controller settings is also about 10. An rf power supply provides power (700 W) to generate a plasma of argon and oxygen ions, which begins the sputtering process from a pure Ta metal target.

The chamber pressure decreases about 0.3 mTorr as the sputtered free Ta atoms react with the polyimide (PI) surface and $O^-$ in the plasma to create a tantalum oxide sublayer, $Ta_2O_5$. Free Ta on the surface of the PI may react with oxygen in the PI substrate or with free oxygen in the plasma. Initially, a Ta-rich layer is more probable than a stoichiometric or an oxygen-rich layer to be in contact with the PI surface, since the amount of free Ta in the plasma is greater than the available $O^-$ between the target and the substrate. This reduces the $O_2$ pressure in the chamber initially. A slow rise in the total pressure occurs during the Ta sputtering process as a thin layer of $Ta_2O_5$ can form on the tantalum target, which reduces the Ta sputtering rate. After two to three minutes, less than 0.1 μm of deposit will be present on the PI surface, with a probable gradient in composition. More metallic Ta may be present near the PI surface than near the top surface of the deposited layer. The top surface may be O-rich, since the chamber pressure rise stops within 0.1 mTorr below the initial chamber pressure.

In general, the chamber pressure decreases due to excess free metal and later rises, to near the initial pressure, due to excess $O^-$. It is this temporary dip in total chamber pressure which has been correlated with good adhesion between the PI and the metal oxide layer, while the subsequent increase in pressure has produced exceptionally stable electrical characteristics in the platinum layer deposited subsequently. The presumed composition gradient in the metal oxide sublayer accomplishes both goals of adhesion and stability simultaneously. If the substrate temperature is too high, the ionized oxygen will begin decomposing the PI surface, prior to deposition, and will yield metal films with poor adhesion.

Gas flow into the chamber is stopped after power to the Ta target is turned off. The substrates are then heated to near 400° C. for 15 to 20 minutes prior to the platinum deposition.

The thickness of the tantalum oxide layer is suitably in the range of 30 to 50 nanometers.

Platinum Metallization

A coextensive platinum metallization layer is sputtered onto the tantalum oxide layer while the samples are still in the sputtering chamber. Ar gas flow is controlled to maintain a chamber pressure of 7 mTorr. A DC magnetron power supply and target configuration deposits about 0.20 μm of Pt in eight minutes at 1000 W of power. The substrates are heated during and after the sputtering process. The Ar gas flow is stopped to evacuate the chamber. The thickness of the platinum metallization is suitably about 100 to 300 nanometers.

It is preferred that the platinum metal be sputtered onto a heated tantalum oxide/polyimide/silicon substrate. This practice improves the electrical resistivity of the final platinum electrodes. Accordingly, the substrate is heated at a temperature above about 250° C. in a low pressure argon gas and the platinum film sputtered onto the surface at this temperature. Such films exhibit a resistivity that is only 1.3 to 1.5 times the resistivity of bulk platinum (10 microohms-cm) without needing to be annealed in air at 750° C., as is typical of other platinum film process practices. The as-deposited platinum film resulting from this heated substrate practice also has a TCR of about 0.30%/°C.

The adhesion of the platinum to the tantalum oxide layer and the adhesion of the tantalum oxide layer to the polyimide layer is excellent. At this stage of the processing, the silicon wafer has successive coextensive coatings of polyimide, tantalum oxide and platinum.

The electrical properties of the platinum film can now be determined precisely by defining long, narrow strips from the coextensive film so as to form, respectively, the heater element 18 and the platinum thermistor elements 20 and 22. The platinum film is to be patterned so that the heater element 18 will be about one millimeter in length and about 50 micrometers wide. Typically, the thermistor elements 20 and 22 are about 850 micrometers in length and 9 micrometers in width. An example of a suitable gap between the heater 18 and the thermistor strips 20, 22 is about 50 micrometers. The photolithographic patterning of platinum films is accomplished using a suitable positive photoresist mask to define the heater strips and the thermistor strips as described. An etchant that is formulated to contain three parts of concentrated hydrochloric acid and one part concentrated nitric acid will etch platinum without attacking photoresist. The acid mixture is heated to a temperature in the range of about 90° C. to 95° C. The color of the mixture changes from deep red to yellow and will etch through 0.20 micrometers platinum in 30 to 40 seconds. High resolution patterns of a line width less than 5 micrometers can be defined without difficulty using a conventional positive photoresist.

Once the platinum strips have been formed, the conductivity of the residual tantalum oxide layer 16 becomes an issue since the platinum etchant does not remove the sublayer 16. The tantalum oxide sublayer can be oxidized to obtain or assure an insulating stoichiometry. This is accomplished or confirmed by annealing the etched wafer in air at about 240° C. to thermally oxidize the sublayer to an electrical insulator. This anneal in air will isolate individual circuits if the sublayer stoichiometry is conductive. However, the TCR of the as-deposited Pt will be reduced by a Ta-rich sublayer.

The application of a second metal (e.g., gold) to the surface of the noncritical areas to reduce the resistance of the overall circuit is desirable. Pressure or wire-bonded contacts to a total thickness greater than just that of the platinum strips (18, 20 and 22) are more reliable. Thus, gold contact pads (24 in FIG. 1) are formed. Typically, Au can be processed by electroplating, evaporating or sputtering a layer up to 2 μm thick and then etching away unwanted Au using a standard mask and gold etch.

It is found that the polyimide/tantalum oxide/platinum layered construction of the sensor illustrated in FIG. 1 provides a device that is stable in air to temperatures of nearly 350° C. Thus, the tantalum oxide barrier layer provides a sensing device that is suitable for use in automotive environments and other potentially high temperature environments. This basic sensor embodiment is a robust and stable construction that can provide prolonged precise and reproducible measurements of air flow or other desirable sensor functions.

Passivated Sensor Structure

In some applications, environmental isolation of the sensor structure is required to protect the circuitry from potential electrical shorting of the platinum strips by surface contaminants such as water. Encapsulating the catalytic metal strips under a thin layer of polymer is a possibility. However, it is preferable to isolate the thin polymeric passivation layer from the catalytic metal strips for the reasons set forth above.

Figure 2:
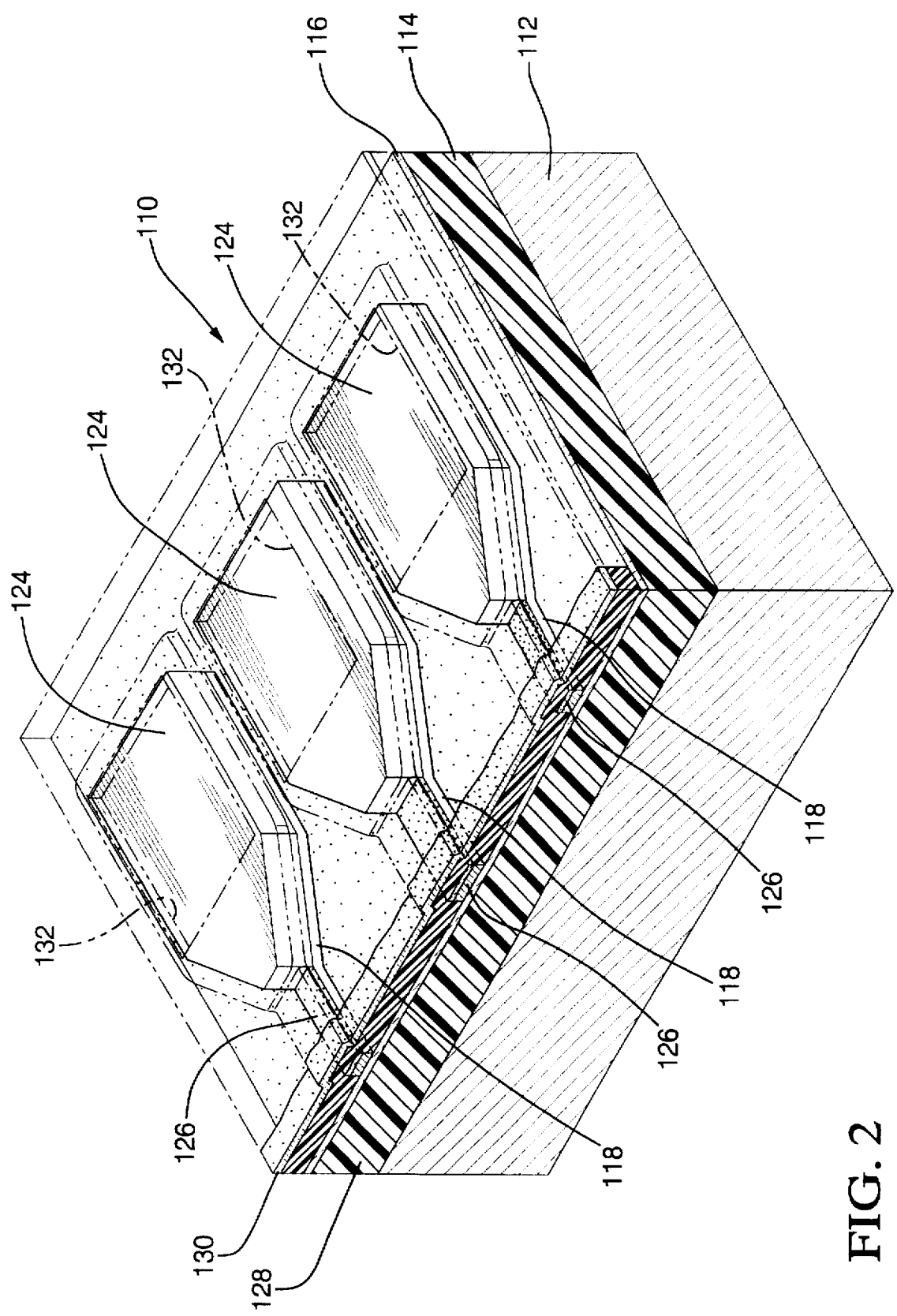
FIG. 2 is an enlarged isometric view, partly broken away and in section, of a silicon/polyimide/tantalum oxide/platinum sensor with passivation overlayers of tantalum oxide, polyimide and tantalum oxide.

Following is a description of a passivated sensor in accordance with the invention and of a practice for its preparation. Reference is had to FIG. 2 in which a passivated sensor 110 is illustrated partly broken away and in section, with some layers shown partly in phantom outline.

For purposes of illustration, the construction of the passivated sensor may start with a silicon wafer support layer 112 substantially the same as the unpassivated sensor embodiment shown in FIG. 1. The polyimide layer 114 is applied as described above to the surface of the silicon wafer, and a tantalum oxide layer 116 is also formed by reactive sputtering as described in connection with FIG. 1.

Thus far, the passivated structure is that same as that of the unpassivated structure illustrated in FIG. 1. Carried on the top surface of tantalum oxide layer 116 is a platinum film heater element 118 and platinum film thermistor elements 120 and 122. The dimensions of these respective platinum elements are suitably the same as those described in connection with unpassivated structure of FIG. 1. Overlying the platinum film elements are coextensive layers of tantalum oxide 126. Covering the platinum metallization and the respective overlying tantalum oxide layers is a layer of polyimide 128 which substantially covers the entire surface of the device. The thickness of this polyimide layer is preferably less than one micron, since its purpose is to chemically but not thermally isolate the platinum thermistors 120 and 122. Finally and optionally, a thin coating of tantalum oxide 130 may be applied over the polyimide layer 128 to protect it during processing and from oxidizing atmospheres. Holes 132 are opened in the tantalum oxide layer 130 and the polyimide layer 128 to permit the formation of gold contact bodies 124 overlying the end portions of the platinum heater 118 and platinum thermistors 120 and 122.

As stated above, the manufacture of the passivated device suitably commences with a silicon wafer and comprises the application of the polyimide layer and tantalum oxide layers as described above in connection with the making of the unpassivated device. A platinum film of the order of 100 to 300 nanometers in thickness is then formed as described above. However, before the platinum film is patterned into the heater element 118 and thermistor elements 120, 122, a tantalum oxide film is formed entirely over the platinum metallization. The thickness of this tantalum oxide film is suitably about 100 nanometers or less. Unlike the tantalum oxide sublayer (i.e., underlying the platinum sensor strips 118, 120 and 122), the overlying tantalum oxide film 126 is to be patterned to coincide with the platinum strips 118, 120, 122. The etching of the tantalum oxide film proceeds best if it has not yet been annealed in air for final conversion to an electrical insulator.

The method of producing a tantalum oxide layer that can be easily etched and patterned is different from that of producing the tantalum oxide sublayer 116. A lower oxygen partial pressure (suitably about 0.5 mTorr) is used at the beginning of the reactive sputtering step. During sputtering, the total chamber pressure is observed to fall, as during the above-described $Ta_2O_5$ sublayer formation, but the pressure does not increase again as when the higher $O_2$ pressure was employed. The lower oxygen pressure produces a tantalum oxide that appears to be on the tantalum-rich side of $Ta_2O_5$ stoichiometry and is easier to etch for patterning.

The patterning of the tantalum oxide is accomplished using a standard positive photoresist mask with an etchant solution of one part hydrofluoric acid, three parts nitric acid and five parts deionized water. This etchant will suitably etch the proper stoichiometry but unoxidized tantalum oxide layer without excessive attack to the masking photoresist. As indicated, the pattern of the tantalum oxide overlayers coincides with the pattern of the subsequently defined (etched) platinum heater element 118 and platinum thermistor elements 120 and 122 using the $Ta_2O_5$ as a Pt etch mask. As illustrated in FIG. 2, the configuration of the overlying tantalum oxide layers 126 coincide precisely with the underlying platinum metallization. At this stage of the process, the tantalum oxide is then annealed in air near 240° C. to assure $Ta_2O_5$ composition and conversion to a suitable electrical insulator material. Gold can then be deposited uniformly onto the entire wafer and patterned to only cover the exposed platinum metal with this shunting and bonding metallization layer.

A thin polyimide layer 128 (< 1 μm) is then formed over the tantalum oxide/platinum sensor strips and optionally a final, very thin layer (< 30 nanometers) of tantalum oxide 130 is formed over polyimide layer 128 by reactive sputtering as described for the overlying layer to permit patterning. Holes 132 are then etched in the tantalum oxide and underlying polyimide to reveal the gold contact pads 124. These gold contact layers were formed as described above to a layer of one to two microns in thickness.

It is found that application of a polyimide coating directly on top of the platinum heater or thermistor strips does not suitably prevent the deterioration of this polyimide passivation layer without the interposed overlayer of tantalum oxide.

The structural and electrical integrity of the preferred embodiment as described in FIG. 2 is excellent. Such a structure (defined from the top side down) of tantalum oxide/polyimide/tantalum oxide/platinum/tantalum oxide/polyimide and silicon has been annealed for 16 hours at 300° C. and an additional two hours at 350° C. No significant change in width or height of the platinum strips or any other element of the structure was apparent, despite this severe test. The structure is found to be electrically stable in air up to 300° C. Since most automotive applications result in exposure to no higher than about 275° C., the passivated structure is deemed to be suitable for such difficult environments.

In summary, the above-described combination of a supported polyimide layer separated from platinum sensor elements by an interposed layer of tantalum oxide is found to provide a structurally stable and electrically stable sensing device. In situations where the sensor is likely to encounter electrically conductive fluids such as water which cause electrical shorting, it is preferred to apply thin passivation layers of tantalum oxide and polyimide over the platinum sensor elements.

As described above, it is preferred to apply the tantalum oxide and the platinum by sputter deposition onto a heated polyimide surface. This practice produces platinum films of better and more stable TCR properties. Since the platinum deposition takes place in argon only, the polyimide/tantalum oxide substrate is suitably heated to temperatures above 250° C. for the platinum deposition. Finally, as also taught above, it is desirable to anneal the tantalum oxide overlayers in air at a temperature near about 240° C. to confirm or assure full oxidation and $Ta_2O_5$ stoichiometry.

Thus, the invention has been described in the context of a support layer/polyimide layer/tantalum oxide layer/platinum strip mass air flow sensor device. However, there will be other layered structures comprising a supported polymeric thermal (or electrical) insulation layer and a metal layer (usually selected for electrical resistance, magnetic properties or the like) in which the metal layer causes degradation of the polymer layer in certain operating conditions and environments. Usually, such metals will be the noble metals, e.g., Pt or Pd, or metals such as Cr, Ni or Fe which may act as polymer degrading catalysts in some conditions. In these situations and in accordance with the invention, a suitable metal oxide layer, e.g., $Ta_2O_5$, $Al_2O_3$ or $Cr_2O_3$, is interposed between the polymer and metal layers. Such oxide layer provides a barrier to metal catalyzed degradation of the polymer and electrical insulation where needed.

Thus, while this invention has been described in terms of a specific embodiment thereof, it will be appreciated that other forms could readily be adapted by one skilled in the art. Accordingly, the scope of this invention is to be considered limited only by the following claims.

We claim:

1. A thin film structure comprising a supported, thermally insulative polyimide layer, a layer of a metal oxide selected from the group consisting of aluminum oxide, chromium oxide and tantalum oxide and deposited on said polyimide layer and at least one metal strip on said metal oxide layer, said metal strip being composed of a metal selected from the group consisting of chromium, iron, nickel, palladium and platinum, the metal oxide layer being coextensive in area with the overlying metal strip so as to provide a chemical stabilization barrier between said polyimide layer and said metal.

2. In a thin film structure comprising an insulative polyimide layer and one or more overlying patterned electrically conductive platinum strips, the improvement comprising a tantalum oxide layer interposed between said polyimide layer and said platinum strip(s) to serve as a barrier to platinum catalyzed thermal degradation of said polyimide layer.

3. A thin film sensing device comprising a supported thermally insulative polyimide layer, a tantalum oxide layer overlying said polyimide layer and, electrically conductive platinum metallization elements overlying said tantalum oxide layer, said tantalum oxide layer being at least coextensive in area with said platinum elements so as to provide a barrier to platinum catalyzed thermal degradation of said polyimide layer and electrical insulation between said platinum elements.

4. A thin film structure as recited in claim 1 additionally comprising a said metal oxide layer(s) overlying said metal strip(s) and coextensive therewith.

5. A thin film structure as recited in claim 2 additionally comprising a tantalum oxide layer(s) overlying said platinum strip(s) and coextensive therewith.

6. A thin film device as recited in claim 3 additionally comprising a tantalum oxide layer(s) overlying said platinum element(s) and coextensive therewith.

7. A thin film structure as recited in claim 4 additionally comprising a said polymer layer overlying said metal oxide layer(s).

8. A thin film structure as recited in claim 5 additionally comprising a polyimide layer overlying said tantalum oxide layer(s).

9. A thin film device as recited in claim 6 additionally comprising a polyimide layer overlying said tantalum oxide layer(s).

10. A thin film device as recited in claim 2 in which the platinum metal was applied to said tantalum oxide layer/polyimide layer that was maintained at a temperature above 250° C. during application of said platinum.

11. A thin film device as recited in claim 2 in which the tantalum oxide layer consists essentially of $Ta_2O_5$.

12. A thin film sensing device as recited in claim 3 in which the platinum metallization was formed on a tantalum oxide layer/polyimide layer that was maintained at a temperature above 250° C. during application of said platinum.

13. A thin film sensing device as recited in claim 3 in which the tantalum oxide layer consists essentially of $Ta_2O_5$.

* * * * *